Aug. 23, 1949.  F. M. HAWLEY ET AL  2,479,617
CHAIN DRIVE ASSEMBLY
Filed May 19, 1943  2 Sheets-Sheet 1
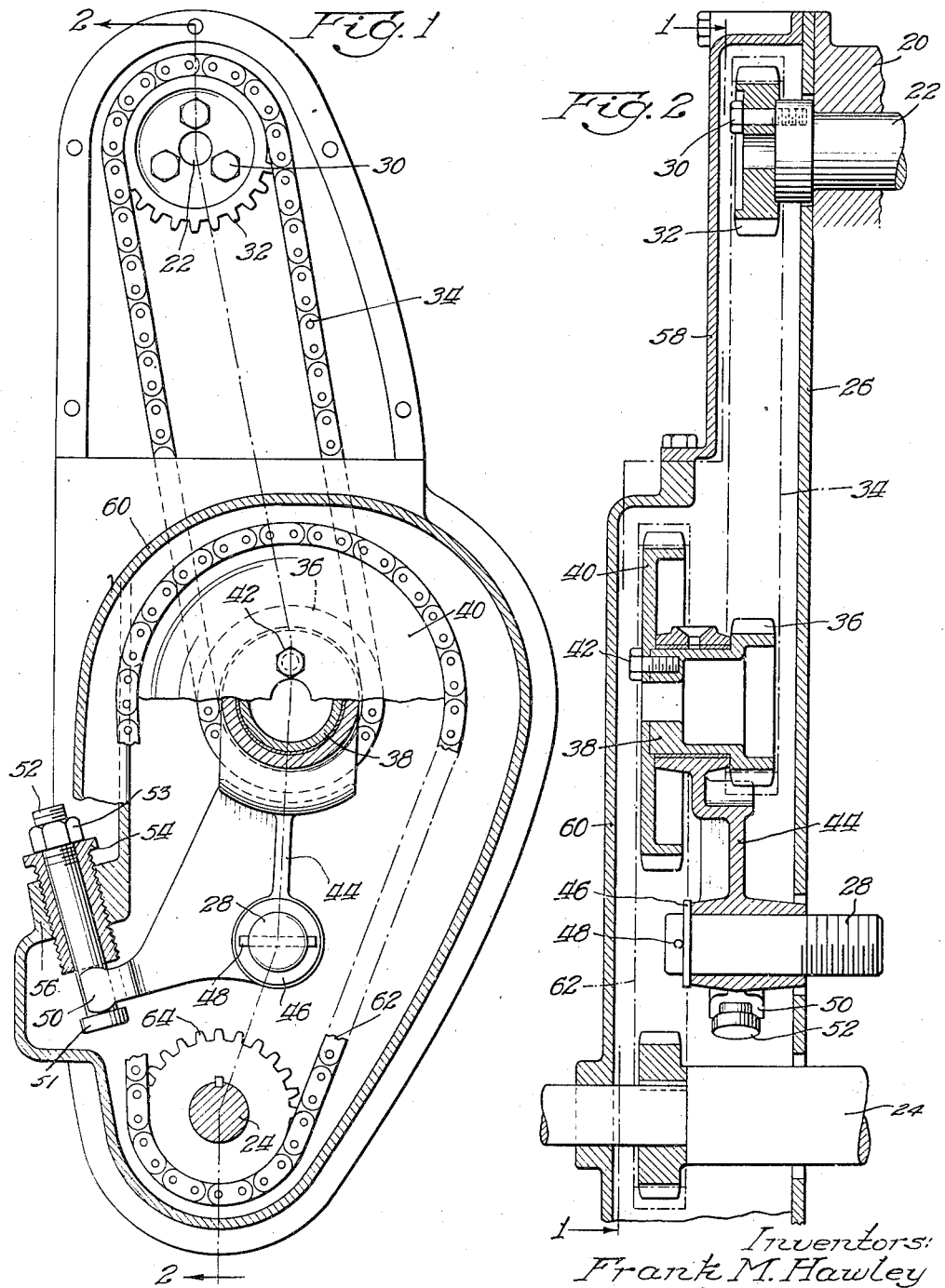
Inventors:
Frank M. Hawley
Ralph E. Cherry
By: Edward C. Gritzbaugh
Atty

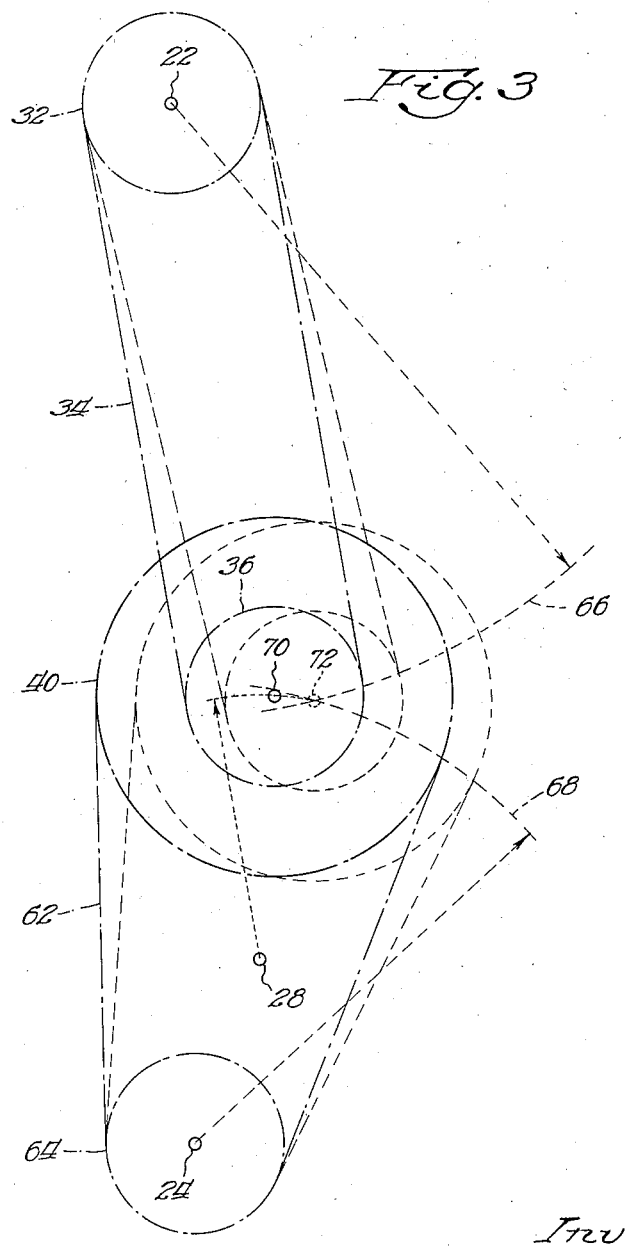

Patented Aug. 23, 1949

2,479,617

UNITED STATES PATENT OFFICE 2,479,617

CHAIN DRIVE ASSEMBLY

Frank M. Hawley and Ralph E. Cherry, Detroit, Mich., assignors to Morse Chain Company, Ithaca, N. Y., a corporation of New York Application May 19, 1943, Serial No. 487,590

8 Claims. (Cl. 74—242.15)

This invention relates to timing chains and the like. More particularly, the invention is directed to an improved chain drive assembly for driving the cam shaft of a motor in timed relation to the crank shaft, whereby the valves of the motor are operated in the proper timing.

In devices of the class described, it is ordinarily necessary to drive the cam shaft at a speed which carries a definite relationship to the speed of the crank shaft. Usually, in an ordinary four-cycle gasoline motor such as is used in an automobile, the speed of the cam shaft is one-half that of the crank shaft, that is, the crank makes two revolutions to each one for the cam shaft. Accordingly, it has in the past been a practice to drive the cam shaft with a chain drive or gear train in which the gear or sprocket on the cam shaft was twice the size of the gear or sprocket on the crank shaft, which in some instances necessitates an unusually wide front of the motor to accommodate the timing mechanism. More particularly is this true in the case of valve-in-head motors.

Among other reasons, in over-head valve motors, the distance between the cam shaft and the crank shaft makes it desirable to drive the cam shaft with a chain means, whereas, heretofore timing chains have been difficult to use for the reasons that the chain has been very lengthy, difficult to adjust to take up for slack. Further, timing chains that are quite long are subject to excessive wear under the action of centrifugal force.

It is an object of the present invention to overcome the above mentioned objectionable features in the use of timing chain.

It is a further object of the present invention to provide a dual chain construction by means of which it is possible to readily adjust the upper and lower timing chains simultaneously by a single adjustment. In this connection it is a feature to disclose an arangement in which two relatively short timing chains are used instead of a single long chain, and to disclose a device which can easily be adjusted to compensate for wear or lag due to any reason, by a single adjustment not requiring any particular skill.

It is an object to disclose a device in which the centrifugal force on each of the chains is low and the other forces acting on each chain are reduced or limited, and thus to provide a device which will provide better service for a longer period.

It is an object to provide a construction in which the timing cam shaft sprocket is relatively small, it being located near the head of the motor on a valve-in-head engine, and in which the more bulky portions of the device including the speed reduction sprockets are located in the lower sections of the motor, thus eliminating a need for a broad upper front, and thereby "cleaning up" the appearance of the device.

It is also an object to provide an arrangement in which the crank shaft timing sprocket is connected to an offset adjustable idler sprocket driven on the same shaft with a second idler sprocket, the first idler or speed reducing sprocket being twice the size of the second and likewise twice the size of the crank shaft sprocket, and in which the second idler sprocket is connected to the cam shaft sprocket by means of a separate timing chain. The first idler sprocket and crank shaft sprocket are operatively connected together in driving relationship by means of a timing chain.

Further, it is an object to provide an arrangement in which the timing chain may be readily and quickly adjusted to take up slack, without removing the timing chain housing, and readjusted after the timing has been disturbed such as when the motor has been torn down, it being possible to disconnect the upper timing chain without disturbing the lower timing chain. It is thus unnecessary to work in the close quarters near the bottom of the motor (and usually closely behind the radiator) in the ordinary adjustments of the timing device.

It is another object of the invention to provide an arrangement in which the timing is accomplished by adjustment of two relatively short chains, driven together by a plurality of connected sprockets on an idler, said idler being in the form of a bell crank or arm with adjustable means comprising a bolt and sleeve assembly for shifting said crank arm about an axle to tighten or loosen the chains simultaneously.

It is, in short, an object to provide an improved construction of timing chain assembly whereby the timing of a motor, such as the valve-in-head motor to which this construction is particularly applicable, is more readily accomplished.

These and other objects and features of this invention will become apparent from the following specification when taken together with the accompanying drawings in which:

Fig. 1 is a front elevational view of a timing chain arrangement for a valve-in-head motor, the view being taken on line 1—1 of Figure 2;

Fig. 2 is a fragmentary side sectional view of the device of Fig. 1, the view being on the lines 2—2 of Fig. 1 looking in the direction of the arrows; and Fig. 3 is a schematic diagram showing the method of calculating the fulcrum of the bell crank and radius of the arc through which it moves to adjust both chains simultaneously.

Referring more in detail to the construction shown in the drawings, and referring first to Figures 1 and 2, there is provided a motor 20, having the usual cam shaft 22 extending through the front wall 26 of said motor near the top thereof, and likewise having a drive shaft 24 extending through said front wall 26.

Cam shaft 22 has, attached to its outer end by means such as a plurality of bolts or the like 30, a timing gear or sprocket 32. This timing gear or sprocket 32 rotates with the cam shaft 22, and is the means through which power is applied to rotate the cam shaft 22. The timing sprocket 32 in turn is driven by a timing chain 34 which rotates at its other end on an idler gear or sprocket 36. Ordinarily, the timing chain 34 has teeth or sprocket-engaging recesses which mesh with teeth on the sprockets 32 and 36.

The idler sprocket 36 rides on an idler shaft 38, and said idler sprocket 36 is integrally connected to the idler sprocket 40, herein sometimes referred to as large idler sprocket, by means of a machine bolt 42 or the like. With this arrangement, the idler sprocket 36 rotates with the idler sprocket 40, and both are carried on the shaft 38 which in turn is carried in the manner indicated by the adjustable bell crank 44. This bell crank 44 is journalled on a stud 28, and is rotatably movable about said stud in an arcuate manner. It is held on the stud by any convenient means such as by the washer 46 and pin 48. The stud 28 is preferably threaded into the body of the motor 20 and securely retained therein.

Referring briefly to Fig. 3, there is indicated the method of determining the location of the fulcrum center for the stud 28. The amount of adjustment required for the chains depends upon the amount of elongation of chain in the strands or portions off the sprockets. Thus the requirement for adjustment of each loop comprising chains 34 and 62 may be assumed to be directly proportional to the number of links off the sprockets in each. Assuming that the lower chain 62 contains 72 links or pitches, and that sprockets 64 and 40 contain respectively 23 and 46 teeth, so that there are approximately 37½ links in the strand which are not on the sprockets; the upper chain is assumed to likewise contain 72 links with each sprocket 32 and 36 having 23 teeth, there being approximately 49 links off the sprockets in the upper chain. The extension of sprocket center position or adjustment for each loop necessary to absorb wear will be in the ratio of 37½ to 49, which means that the adjustment requirements for the upper chain 34 will be approximately 130% of the lower chain 62. On the basis of normal service, it may be assumed, for example, that the requirements for adjustment of the lower chain will be .100"; and on an equal basis the upper chain will then require an adjustment of .130" of sprocket movement radially away from the centers of the upper and lower sprockets.

According to the method illustrated in Figure 3, an arc 66 is drawn from the center of the sprocket 32 and an arc 68 is drawn from the center of the sprocket 64, with a radius extended beyond the initial center position 70 where the idler shaft accommodates both chains in a position of initial adjustment, the arc radius of the arc 66 being .130" greater than the radius from the center of sprocket 32 to the initial center 70, and the radius of the arc 68 being .100" greater than the radius from the center of sprocket 64 to the initial center 70. The arcs 66 and 68 will cross at the point 72. A point located on the perpendicular bisector of the center line of the points 70 and 72 on the same side as the chain with least number of links off the sprockets, and at a distance equal to the radius of the arc through the points 70 and 72 will determine the location of the center of the stud 28. This will determine the location of the idler shaft on the bell crank, which will be at the point 70 for initial movement and will move to the vicinity of the point 72 in adjustment. Such a system of calculating the position of the timing chain, regardless of the number of links off the sprocket and regardless of the length of each chain, will give a satisfactory adjusting movement of the bell crank within the limits of normal adjustment.

A bell crank provides a more simple means of adjustment operation than would be possible with a straight sliding motion. This same procedure is likewise available where the drive characteristics cause unequal wear of the upper and lower chains, but where the ratio of the wear is known. Other sprocket combinations likewise may be used, and the positions calculated as readily.

Referring again to Figures 1 and 2, the bell crank 44 is provided at its other end with a bolt engaging portion, herein for purpose of clarity referred to as jaw 50. The jaw 50 engages the adjustment bolt 52, which has a surrounding hollow threaded sleeve 54. The inner end of sleeve 54 is spaced from bolt head 51, and said bolt 52 is adjustably secured in the sleeve by lock nut 53 as shown in Fig. 1. This effects an adjustable assembly having an annular channel at its inner region inside the housing to receive jaw 50 of the bell crank, which channel may be varied in dimension to take care of wear or structural variations as well as to operate the bell crank to tighten or loosen the chains; and all of these functions may be accomplished without requiring access to the interior of the housing. This threaded sleeve 54 is preferably mounted by threading it into a lug extending forwardly from the motor, such as the lug 56. This lug 56 may be either a part of the motor itself, or a part of the housing consisting of the cover plates 58 and 60 forming the protective cover for the timing chain assembly. Preferably the sleeve member 54 is threaded into a portion of the motor block proper and extends at its upper end outside the cover or housing, so that it will be solid, will not shift with respect to the stud 28 and may be turned for adjustment without removing the cover plates.

The sleeve 54 may be threaded in or out of its position as shown in Figure 1, and thereby the crank arm 44 will be moved arcuately about the stud 28, shifting the position of the idler shaft 38 with its idler gears 34 and 40, and thereby shortening or lengthening the center to center positions between the center of the drive shaft 24 and the idler shaft 38, and the center of the cam shaft 22 and the idler shaft 38. It is thus seen that movement of the jaw portion 50 upwardly by threading the sleeve 54 to the left will shift the idler gears to the right and correspondingly tighten both timing chains simultaneously. The timing chain may be loosened by movement of the sleeve 54 in the other direction by threading it downwardly. This means that the timing chain 34, may be readily removed and adjusted or the engine torn down or otherwise worked on in its head portion without disconnecting the timing chain 62, thereby making it easy to time the motor again without worrying about the adjustment of the timing chain 62. It is noted that the timing chain 62 is driven by the sprocket 64 on the drive shaft 24, which sprocket is keyed or otherwise fixed to the drive shaft to rotate therewith, and it is further noted that the timing chain 62 and sprocket 64 are located in close quarters and ordinarily should not be disconnected if it can be avoided.

The above construction represents a new approach to the timing of valve-in-head motors, in particular, and will eliminate several serious objections to the valve-in-head motor. By use of the timing chain arrangement here disclosed, long gear trains are eliminated, the timing chain is accurate and quiet in the length necessary to use with the arrangement herein disclosed, and the system is rugged and ordinarily will not get out of adjustment. It will therefore remain in time even when there is adjustment of the chains, accomplished by adjustment of the sleeve 54 and crank arm 44 as above described. Further, the front of the engine may be reduced in size near the head by using such a gear as the gear 32, while the large idler gear is placed near the center of the front or below the center. The advantages of this arrangement are obvious.

While we have described our invention in connection with one specific embodiment thereof, it is to be understood that this is by way of illustration and not by way of limitation and the scope of our invention is defined solely by the appended claims which should be construed as broadly as the prior art will permit.

We claim:

1. In combination with a motor having housing means, drive shaft, and valve operating cam shaft, said drive shaft and cam shaft having fixed axes of a timing means comprising a driving sprocket attached to and driven by said drive shaft, a cam shaft sprocket attached to and driving said cam shaft, a bell crank mounted for arcuate movement between said drive shaft sprocket and said cam shaft sprocket, an enlarged idler sprocket carried by said bell crank and positioned on said bell crank for arcuated movement thereby, a second idler sprocket drivingly attached to said first idler sprocket and of reduced size with respect thereto, adjusting means coacting with an arm of said bell crank and extending to the outside of said housing, said adjusting means comprising a threaded sleeve mounted on said housing and extending through said housing to the outside thereof, and a bolt in said threaded sleeve and arranged with its head inside said housing in engagement with said bell crank, whereby threading said threaded sleeve into and out of said housing moves said bell crank arcuately about its mounting, and a plurality of timing chains, one of which is mounted in driving relation on said drive shaft sprocket and said first mentioned large idler gear sprocket and another of said chains is mounted between said cam shaft sprocket and said second mentioned idler sprocket, the arrangement being such that movement of said bell crank about its mounting by adjustment of the sleeve tensions the timing chains substantially uniformly without changing the fixed axes of said drive shaft and cam shaft.

2. In combination, a driving shaft and a driven shaft, said shafts having fixed axes, a housing means, a stub shaft mounted in said housing generally intermediate said drive shaft and driven shaft, sprockets of substantially equal size on said drive shaft and driven shaft, adjustable means carried by said stub shaft comprising an arm radial to said stub shaft and an actuator coacting with said arm, intermediate sprocket means comprising two integral sprockets, one of which is larger than the drive and driven shafts sprockets, and the other of which is substantially the same size as the drive and driven shaft sprockets, said integral sprockets carried by said adjustable means and arcuately movable about said stub shaft by said actuator, the centers of said sprockets being movable on an arc about said stub shaft which arc passes through substantially the points of intersection of arms about the fixed axis of the drive shaft and the fixed axis of the driven shaft respectively, chain means from said drive sprocket to the larger one of said intermediate sprockets and a second chain means from the other intermediate sprocket to said driven sprocket, said last mentioned arms having radii substantially equal to the distances from the respective fixed axis of the drive and driven shafts to the centers of the intermediate sprockets plus the respective adjustment requirements for the chains from the drive and driven sprockets to the intermediate sprockets.

3. In combination, a driving shaft and a driven shaft having axes fixed with relation to each other, a housing means, a stub shaft mounted in said housing generally intermediate said drive shaft and driven shaft, sprockets of substantially equal size on said drive shaft and driven shaft, adjustable means carried by said stub shaft comprising an arm radial to said stub shaft and an actuator coacting with said arm, intermediate sprocket means comprising two integral sprockets, one of which is larger than the drive and driven shafts sprockets, and the other of which is substantially the same size as the drive and driven shaft sprockets, said integral sprockets carried by said adjustable means and arcuately movable about said stub shaft by said actuator, the centers of said sprockets being movable on an arc about said stub shaft which arc passes through substantially the points of intersection of arcs about the fixed axis of the drive shaft and the fixed axis of the driven shaft respectively, chain means from said drive sprocket to the larger one of said intermediate sprockets and a second chain means from the other intermediate sprocket to said driven sprocket, said last mentioned arms having radii substantially equal to the distances from the respective fixed axes of the drive and driven shafts to the centers of the intermediate sprockets plus the respective adjustment requirements for the chains from the drive and driven sprockets to the intermediate sprockets, and means carried by said housing for actuating the adjustable means and thereby causing the intermediate sprockets to move through an arc tightening the chains.

4. In combination, a driving shaft and a driven shaft having axes fixed with relation to each other, a housing means, a stub shaft mounted in said housing generally intermediate said drive shaft and driven shaft, sprockets of substantially equal size on said drive shaft and driven shaft, adjustable means carried by said stub shaft comprising an arm radial to said stub shaft and an actuator coacting with said arm, intermediate sprocket means comprising two integral sprockets, one of which is larger than the drive and driven shafts sprockets, and the other of which is substantially the same size as the drive and driven shaft sprockets, said integral sprockets carried by said adjustable means and arcuately movable about said stub by said actuator shaft, the centers of said sprockets being movable on an arc about said stub shaft which arc passes through substantially the points of intersection of arcs about the fixed axes of the drive shaft and the fixed axes of the driven shaft respectively, chain means from said drive sprocket to the larger one of said intermediate sprockets and a second chain means from the other intermediate sprocket to said driven sprocket, said last mentioned arms having radii substantially equal to the distances from the respective fixed axes of the drive and driven shafts to the centers of the intermediate sprockets plus the respective adjustment requirements for the chains from the drive and driven sprockets to the intermediate sprockets, and means carried by said housing for actuating the adjustable means and thereby causing the intermediate sprockets to move through an arc tightening the chains, said actuating means extending outside the housing whereby it is operated outside the said housing means.

5. In a chain drive assembly, a driving sprocket mounted for rotation about a fixed axis, a driven sprocket likewise mounted for rotation about a fixed axis removed from said first mentioned axis, a pair of intermediate sprockets operatively connected together in driving relationship and mounted for rotation about a movable axis which is mounted for arcuate movement about a fixed center only slightly laterally spaced from a plane connecting said fixed axes whereby movement of said movable axis in one direction will, by a toggle action, substantially lengthen the distance between the axis of said driving sprocket and the movable axis and simultaneously substantially lengthen the distance between the axis of said driven sprocket and said movable axis, a driving chain connecting said driving sprocket with one of said intermediate sprockets, a driving chain connecting said driven sprocket with the other intermediate sprocket, and means for adjusting said movable axis in its arcuate path in either direction.

6. In a speed-change drive assembly, a driving sprocket mounted for rotation about a fixed axis, a driven sprocket likewise mounted for rotation about a fixed axis removed from said first mentioned axis, a pair of intermediate sprockets operatively connected together in driving relationship and mounted for rotation about a movable axis mounted for arcuate movement by an arm pivoted about a fixed center only slightly laterally spaced from a plane connecting said fixed axes, the line joining said movable axis and said fixed center extending generally parallel to said plane, whereby said arcuate movement of said movable axis in one direction will by a toggle action substantially lengthen the distance between the axis of said driving sprocket and the movable axis and substantially lengthen the distance between the axis of said driven sprocket and said movable axis, a driving chain connecting said driving sprocket with one of said intermediate sprockets, a driving chain connecting said driven sprocket with the other intermediate sprocket, and means for moving said movable axis in its arcuate path in either direction.

7. In a chain drive assembly, a driving sprocket mounted for rotation about a fixed axis, a driven sprocket likewise mounted for rotation about a fixed axis removed from said first mentioned fixed axis, a pair of intermediate sprockets operatively connected together in driving relationship and mounted for rotation about a movable axis mounted for arcuate movement about a fixed center, a driving chain connecting said driving sprocket with one of said intermediate sprockets, a driving chain connecting said driven sprocket with the other intermediate sprocket, said fixed center being only slightly laterally spaced from a plane connecting the fixed axis of said driving sprocket with the movable axis of said intermediate sprockets when the latter are so positioned as to maintain said chains substantially taut whereby movement of said movable axis in one direction will by a toggle action substantially lengthen the distance between the axis of said driving sprocket and the movable axis and simultaneously substantially lengthen the distance between the axis of said driven sprocket and said movable axis, and means for moving said movable axis in its arcuate path in either direction.

8. In a chain drive assembly, a driving sprocket mounted for rotation about a fixed axis, a driven sprocket likewise mounted for rotation about a fixed axis removed from said first mentioned axis, a pair of intermediate sprockets operatively connected together in driving relationship and mounted for rotation about a movable axis mounted for arcuate movement about a fixed center, a driving chain connecting said driving sprocket with one of said intermediate sprockets, a driving chain connecting said driven sprocket with the other intermediate sprocket, said fixed center being located in a region determined by ascertaining the intersection of an arc described about the axis of said driving shaft with an arc described about the axis of said driven shaft on radii having increments of length respectively equal to the normal distance between said driving shaft and the normal position of said movable shaft when both chains are taut and the normal distance between said driven shaft and said normal position, plus additional increments of length respectively which are proportional to the respective lengths of the straight-away portions of said first and second mentioned chains, whereby movement of said movable axis in one direction will, by a toggle action, lengthen the distance between the axis of said driving sprocket and the movable axis and simultaneously lengthen the distance between the axis of said driven sprocket and said movable axis to compensate equally for wear in connection with both of said chains, and means for moving said movable axis in its arcuate path in either direction.

FRANK M. HAWLEY.
RALPH E. CHERRY.

REFERENCES CITED

The following references are of record in the file of this patent:

UNITED STATES PATENTS

| Number | Name | Date |
|---|---|---|
| 581,328 | Borton | Apr. 27, 1897 |
| 1,119,151 | Halbleib | Dec. 1, 1914 |
| 1,388,449 | Brasseur | Aug. 23, 1921 |
| 1,662,229 | Ballot | Mar. 13, 1928 |
| 1,978,526 | Eppler, Jr. | Oct. 30, 1934 |
| 2,287,450 | Price | June 23, 1942 |
| 2,258,778 | Lewis | Oct. 14, 1941 |

FOREIGN PATENTS

| Number | Country | Date |
|---|---|---|
| 90,653 | Sweden | Aug. 26, 1937 |